United States Patent [19]

Banister et al.

[11] 4,268,491

[45] May 19, 1981

[54] PRODUCING SULPHUR-NITROGEN GROUPS

[75] Inventors: Arthur J. Banister, Durham; Andrew J. Fielder, High Shincliffe; Zdenek V. Hauptman, Bishop Auckland; Nigel R. M. Smith, Packington, Nr. Ashby de la Zouch, all of England

[73] Assignee: National Research Development Corporation, London, England

[21] Appl. No.: 88,813

[22] Filed: Oct. 26, 1979

[51] Int. Cl.³ .................. C01B 17/00; C01B 17/45
[52] U.S. Cl. ............................ 423/406; 423/351; 423/467
[58] Field of Search .................. 423/351, 406, 467

[56] References Cited

U.S. PATENT DOCUMENTS 3,384,461 5/1968 Beck ............................ 423/351

FOREIGN PATENT DOCUMENTS 1141341 1/1969 United Kingdom.

OTHER PUBLICATIONS

Muthmann W. et al., "Z. Anorg., und Allgem. Chem." 1896, 13, pp. 200–208.
"Chem. Abst.", vol. 75, 1971—104648g.
"Chem Abst.", vol. 75, 1971—136665b and 136669f.
"Chem. Abst.", vol. 81, 1974—72075y.
Mikulski, C. M. et al., J.A.C.S., Oct. 29, 1975-pp. 6358—6363.

Primary Examiner—G. O. Peters
Attorney, Agent, or Firm—Oblon, Fisher, Spivak, McClelland & Maier

[57] ABSTRACT

Compounds containing sulphur-nitrogen groups, such as $S_4N_4$, $S_5N_5^+$ salts and poly(sulphur nitride), are made by reducing $S_4N_3Cl$ or related compounds with anions (e.g. iodide) or metals (e.g. silver). Poly(sulphur nitride) may be made by passing $S_4N_3Cl$ vapor or $S_5N_5FeCl_4$ vapor through sulphidized silver wool and condensing the vapor.

15 Claims, 1 Drawing Figure

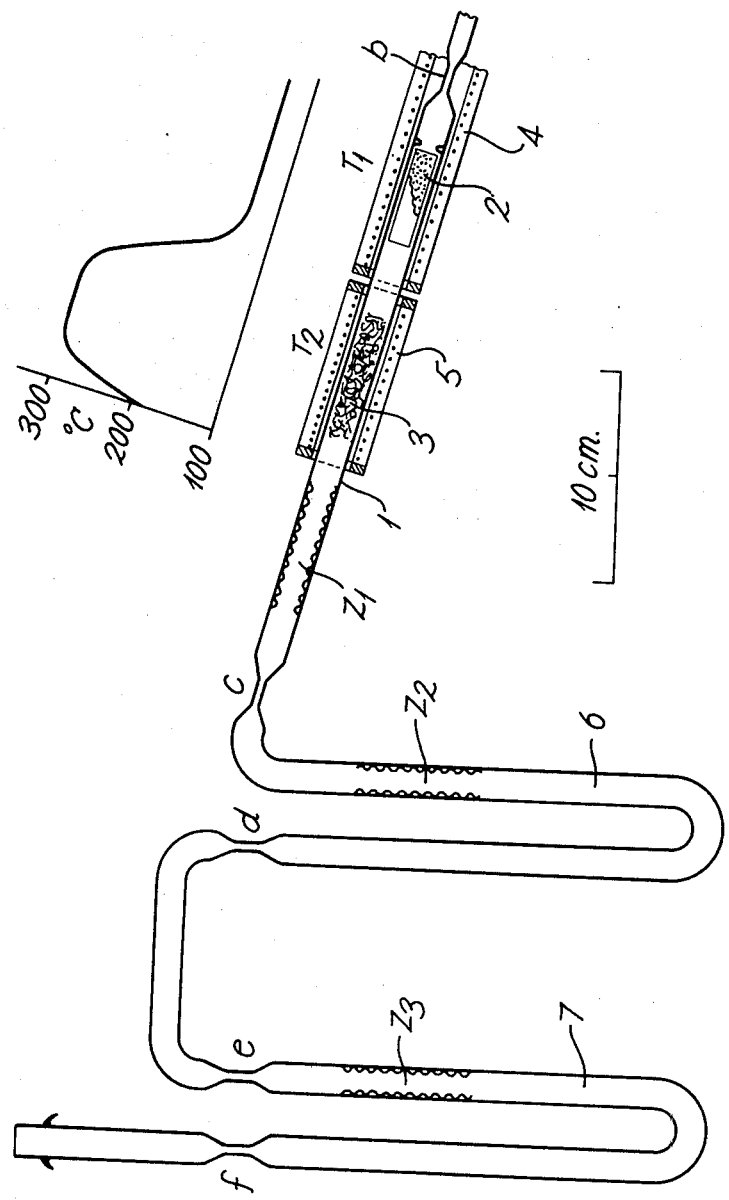

PRODUCING SULPHUR-NITROGEN GROUPS

This invention relates to the production of sulphur-nitrogen (SN) groups, and to compounds containing them, such as $S_4N_4$, $S_5N_5^+$ salts and poly(sulphur nitride) compounds and to methods of preparing them. The poly (sulphur nitride) compounds include derivatives containing halogen which are electrically conducting polymers with no metal atoms, and can be compressed rather like graphite to form black semiconducting blocks. In some cases, the electrical resistance increases with voltage to a maximum and then falls with further increasing voltage.

The invention consists in producing SN groups (either in the form of $S_4N_4$ molecules or instantaneously reacting to form a compound containing an —S—N— grouping), by reducing the species $S_aN_bX_c$ where X is a monovalent group such as nitrate or a halogen, preferably Cl, (or 1/n of an n-valent group), $a \geq b$ and $a \geq c$ (and preferably $b \geq c$) and a is up to 6, e.g. NSX, $S_3N_3X_3$, $S_4N_3^+$, $S_5N_5^+$ $S_3N_3X$ or $S_6N_4X_2$. This reduction may be done in the presence of a reagent which will react with any $S_4N_4$ produced to form a further compound containing an —S—N grouping. The reducing agent may be for instance a metal (such as iron (e.g., filings) or silver (e.g. wool) to titanium (e.g sponge)) or may contain reducing anions such as chalcogenide, iodide, oxalate, hypophosphite, thiosulphate or metabisulphite, and may be dissolved or suspended in a non-aqueous medium, such as nitromethane $CH_3NO_2$, dichloromethane $CH_2Cl_2$, or methanol $CH_3OH$, or may be used in certain instances in the vapor phase. Aqueous solutions (e.g. concentrated ice-cold aqueous $Na_2S_2O_5$ with $S_3N_2Cl$ or $S_4N_3Cl$) may be advantageous in certain circumstances. In some cases, reaction may occur (at least in part) even in the absence of solvent.

Examples of the species $S_aN_bCl_c$ are $S_4N_2Cl$ (which are easy to make and have gratifyingly low sensitivity to moisture), and $S_3N_2Cl_2$ and $S_3N_3Cl_3$. The preferred compounds are $S_4N_3Cl$ and $S_3N_2Cl$, but $S_3N_2Cl_2$ can be used in this preferred mode by converting it first to $S_3N_2Cl$, for example by heating to about 80° C. in vacuo, when NSCl and $SCl_2$ are also formed, or by treatment with formic acid HCOOH. $S_3N_3Cl_3$ for this purpose includes NSCl (which is normally in equilibrium with $S_3N_3Cl_3$), and also the ion $ClS—N=SCl^+$ (formed for example by the reaction $\frac{1}{3}S_3N_3Cl_3 + SCl_2 + AlCl_3 \rightarrow [N(SCl)_2]^+ AlCl_4^-$.)

Examples of compounds containing an —S—N-grouping, which may be produced according to the invention, include (apart, of course, from $S_4N_4$ itself) 1,2,5-thiadiazoles; other heterocyclic and chain compounds such as $R^1(SN)_nR^2$ where $R^1$ and $R^2$ are chain-terminating groups e.g. (i) $R^3(SN)_2SR^4$ and (ii) $R_2^5C=N(SN)_2SN=CR_2^6$, which are highly coloured compounds whose hue varies with $R^{3-6}$; and (iii) polymers $(—SN—)_x$ and $(SN\ Halogen_c)_x$ where $c \leq 1$ and x is large; these polymers contain sulphur-nitrogen groups and are notable for an electrical conductivity approaching that of mercury, strongly anisotropic metallic properties and super-conductivity below 0.26K. For some of the above products and under the right conditions (e.g. sufficiently high temperature) the compound $S_4N_4$ reacts rapidly so that even if $S_4N_4$ itself were produced according to the invention, it would be practically instantaneously reacted to form the desired compound, so that practically no free $S_4N_4$, which is potentially explosive, is present at any time.

Where the desired compound in fact is $S_4N_4$, this may be purified by recrystallisation (e.g. from dichloromethane, 1,4-dioxan, benzene or toluene).

The invention in a further aspect provides the new compound(s) $(S_3N_bI_c)_x$ where b is from 1.9 to 2.3 (preferably 2.1 to 2.3), c is from 0.4 to 1.3 (preferably 0.4 to 0.6), and x is large. At the higher iodine contents, free iodine may be present.

The invention also provides a method of preparing the compound $(S_3N_bI_c)_x$, comprising contacting $S_4N_3Cl$ vapour with an iodide and cooling the contacted vapour to below room temperature, preferably 0°–15° C. The iodide may be in the form of a salt, preferably an alkali metal salt, and may be held at at least 150° C., preferably at least 200° C., e.g. around 250° C.

In a further aspect, this invention relates to poly(sulphur nitride) compounds. Such compounds, which may be doped with a proportion of halogen, are electrically conducting polymers. Some of these compounds become superconducting at low temperatures. They may be useful as the contact material in Schottky diodes on semiconducting devices, for example as the contact material on GaAs solar cells.

According to the present invention, poly (sulphur nitride) is made by contacting $S_4N_3Cl$ vapour with silver sulphide and allowing the contacted vapour to condense (at −196° C.) to give $S_2N_2$ which polymerises at room temperature to give $(SN)_x$. The silver sulphide is preferably held at at least 250° C. The silver sulphide may be derived from metallic silver which is sulphided by the contact with the $S_4N_3Cl$ vapour.

Also according to the present invention, poly (sulphur nitride) is made by heating $S_5N_5FeCl_4$ in an inert atmosphere to at least 100° C. and condensing the resulting vapour at between −100° C. and 20° C., preferably from 0° C. to 15° C. Preferably, in order to lessen he proportion of $S_4N_4$ which is formed and which condenses at a slightly different temperature, the vapour is contacted with silver before being condensed. By this method, thin layers of poly (sulphur nitride) can be obtained, useful for a contact material in semiconducting devices.

The invention will now be described by way of example.

The accompanying drawing illustrates apparatus used in Example 19.

EXAMPLE 1

In Examples 1 to 7, $S_4N_4$ is produced from $S_3N_2Cl$. $S_3N_2Cl$ (0.10 g, 0.63 mmole) was ground with 0.12 g (0.75 mmole) of dry sodium iodide NaI in a glove-box, at a temperature of about 20° C. After 15 minutes, examination of the infra-red absorption peaks of the reactants showed that no $S_3N_2Cl$ remained, and that $S_4N_4$ was present. Thus, the following reaction scheme is indicated where $S_3N_2I$ is a possible reaction intermediate:

A soxhlet extraction of the products, using 1,4-dioxan, yielded $S_4N_4$, as well as iodine and some hydrolysis products.

EXAMPLE 2

A suspension comprised $S_3N_2Cl$ (0.30 g, 1.9 mmole) in 10 ml of nitromethane $CH_3NO_2$. (In another experiment, the volume of (refluxing) nitromethane was a third of this, with some diminution in yield). Into the suspension was stirred $Na_2S_2O_5$ (0.55 g, 2.9 mmole) under nitrogen at 90° C. A reaction occurred, and appeared to be complete after about 15 minutes. After filtration, washing the product with ice-cold water and recrystallisation from dichloromethane (to remove sulphur), some 0.12 g of $S_4N_4$ (identified by infra-red analysis and nitrogen analysis) were obtained, representing a yield of 69%.

EXAMPLE 3

$S_3N_2Cl$ was treated with an aqueous solution of sodium iodide. Liberated iodine was extracted using tetrachloromethane, and infra-red analysis of the products showed that $S_4N_4$, as well as some hydrolysis products, had formed.

EXAMPLE 4

Impure $S_3N_2Cl$ (2.75 g, 17.2 mmole obtained by heating 5.3 g $S_3N_2Cl_2$, 27.2 mmole) was stirred (2 hours, 100° C.) with iron turnings (0.96 g, 17 mmole) suspended in nitromethane (50 ml). After filtration while hot and evaporation of solvent under reduced pressure (to 15 ml), the product (1.1 g) was recrystallised from dichloromethane to give $S_4N_4$ (0.7 g, 28% yield from $S_3N_2Cl_2$).

EXAMPLE 5

Example 4 was repeated using 1.67 g, 10.5 mmole of the $S_3N_2Cl$ and 0.6 g of the iron turnings (10.7 mmole) for 2 hours in 30 ml refluxing nitromethane. The mixture was cooled and filtered, and the resultant brown solid extracted from 30 ml tetrachloromethane to give 0.25 g tetrasulphur tetranitride $S_4N_4$ in a yield of 26%.

EXAMPLE 6

$S_3N_2Cl$ (5.0 g, 31.3 mmole) was reacted with sodium iodide (5.4 g, 36.0 mmole) in 20 ml methanol at 0° C. for ½ hour. Elemental iodine was quantitatively removed using aqueous sodium thiosulphate, leaving a black mixture of $S_4N_4$ and iodinated poly (sulphur nitride), the formation of the latter being favoured by the presence of water. From this mixture $S_4N_4$ was isolated in a yield of about 40% by extraction using dioxan as a solvent. However, the $S_4N_4$ was contaminated with sulphur $S_8$ as shown by thin-layer chromatography, using which technique (employing anhydrous silica gal or alumina with hexane as elutant) good recovery of $S_4N_4$ is possible. Excessive moisture can hydrolyse the iodinated polymer.

EXAMPLE 7

Example 6 was repeated, using 6.0 g, 37.6 mmole of the $S_3N_2Cl$ and 8.45 g of the anhydrous sodium iodide (56.4 mmole) stirred for 1½ hours in 30 ml dry methanol at 0°. Anhydrous sodium thiosulphate $Na_2S_2O_3$ (8.9 g, 56.4 mmole) in 30 ml dry methanol was added to remove liberated iodine, and the mixture was stirred for 18 hours. The filtered yellow-green product was extracted with 1,4-dioxan to give 1.8 g of a mixture which analysed as 66% tetrasulphur tetranitride $S_4N_4$ and 34% sulphur by weight.

EXAMPLE 8

In Examples 8 and 9, $S_4N_4$ is produced from $S_3N_2Cl_2$, chlorocyclotrithiadiazenium chloride. In Example 9, a further product containing sulphur-nitrogen groups also arises.

$S_3N_2Cl_2$ was refluxed for 8 hours in a nitromethane solution with $Na_2S_2O_5$. The products were washed with water. Infra-red analysis indicated $S_4N_4$ together with hydrolysis products.

EXAMPLE 9

A mixture of chlorocyclotrithiadiazenium chloride ($S_3N_2Cl_2$) (7.0 g, 35.9 mmole) and iron turnings (2.5 g, 44.6 mmole) was stirred for 6 hours in refluxing nitromethane (40 ml). Intermediate green and yellow colours indicated that the reaction probably proceeded via cyclotrithiadiazenium chloride ($S_3N_2Cl$) and then cyclotetrathiatriazenium chloride ($S_4N_3Cl$) and/or cyclotetrathiatriazenium tetrachloroferrate $S_4N_3^+FeCl_4^-$. After cooling and evaporation of the nitromethane under reduced pressure, the resultant solid was extracted in tetrachloromethane (50 ml) to give tetrasulphur tetranitride (0.6 g, 18% yield) and a residue of cyclotetrathiatriazenium tetrachloroferrate (III) which was the main product.

EXAMPLE 10

In Examples 10 and 11, $S_4N_4$ is formed from $S_3N_3Cl_3$. $S_3N_3Cl_3$ (0.20 g, 0.82 mmole) was dissolved in dry 1, 2 dimethoxyethane $CH_3$—O—$CH_2$—$CH_2$—O—$CH_3$ (10 ml). This solution was pale green. Then iron (0.05 g, 0.89 mmole) was added, in the form of commercial activated sponge, at room temperature. The solution deepened in colour, becoming deep orange-red after 5-10 minutes. It was verified that the solution contained $S_4N_4$ by thin-layer chromatography of a sample of the solution in parallel with a solution of known $S_4N_4$. The chromatography was performed on a silica gel plate, using carbon disulphide $CS_2$ as elutant and detecting the $S_4N_4$ by ultraviolet light.

EXAMPLE 11

Example 10 was repeated but this time using $S_3N_3Cl_3$ (7.0 g, 28.6 mmole) and iron (2.5 g, 44.8 mmole) in the form of turnings. The mixture was stirred for 1 hour in 1,2 dimethoxyethane (40 ml). An exothermic reaction occurred and thin layer chromatography showed $S_4N_4$, $S_4N_2$ (and probably $S_4N_3^+$) to be present. The mixture was refluxed for 1 hour, cooled, and the dimethoxymethane evaporated under reduced pressure. Tetrasulphur tetranitride was extracted from the crude product using 50 ml tetrachloromethane (50 ml) and recrystallised from benzene (65 ml) to give tetrasulphur tetranitride (2.65 g, 67% yield).

EXAMPLE 12

In Examples 12 to 14, $S_4N_4$ is produced from $S_4N_3Cl$ (cyclotetrathiatriazenium chloride).

$S_4N_3Cl$ was stirred with $Na_2S_2O_5$ in molar ratio 1:1.15 in refluxing nitromethane for 1 hour. The products were washed with water. Infra-red analysis indicated $S_4N_4$ together with hydrolysis products. Recrystallisation from dichloromethane gave $S_4N_4$ (25% yield).

EXAMPLE 13

A mixture of $S_4N_3Cl$ (5.0 g, 24.3 mmole) and iron turnings (1.5 g, 26.8 mmole) was stirred for 1½ hours in refluxing nitromethane (100 ml) to give a clear red solution. This was filtered hot (grade 1 sinter). Crude $S_4N_4$ crystallised out on cooling. The filtered product was extracted with 50 ml tetrachloromethane and recrystallised from benzene (50 ml) to give 1.86 g, $S_4N_4$ in 55% yield.

EXAMPLE 14

A mixture of $S_4N_3Cl$ (1.0 g, 4.9 mmole) and sodium thiocyanate (0.5 g, 6.2 mmole) was stirred for 1 hour in refluxing $CH_3O(CH_2)_2OCH_3$ (30 ml). After cooling, the orange product was filtered and extracted from 30 ml tetrachloromethane to give $S_4N_4$ (0.22 g, 33% yield).

EXAMPLE 15

Preparation of $S_4N_4$-norbornylene derivative.

$S_4N_3Cl$ (4.0 g, 19.5 mmole) was stirred for two hours with iron turnings (1.0 g, 17.8 mmole) suspended in refluxing nitromethane (40 ml). The mixture was cooled, filtered and the solid soxhlet extracted with dioxan (150 ml.) Norbornylene (7.0 g, 74.5 mmole) was added and the mixture stirred for eighteen hours at 50° C. Crude $S_4N_4(C_7H_{10})_2$ (2.1 g) came out of solution, was filtered and recrystallised from chloroform:ether (25 ml: 5 ml) to give $S_4N_3(C_7H_{10})_2$ (1.4 g, 26% yield based on $S_4N_3Cl$):

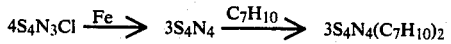

U.K. Pat. No. 1445968 has claims which are relevant to Example 15.

EXAMPLE 16

In this Example, we proceed direct to the formation of a Lewis acid adduct without intermediately isolating $S_4N_4$. The adduct in question is $(S_4N_4)_2SnCl_4$, i.e. the sulphur nitride/tin tetrachloride adduct. The adduct can be reduced to tetrasulphur tetramide.

A mixture of $S_4N_3Cl$ (2.2 g, 10.7 mmole) and iron turnings (0.70 g, 12.5 mmole), suspended in nitromethane (100 ml), was heated under reflux for 90 minutes to give a clear red solution. After filtration through a grade 1 sinter filter and cooling, tin tetrachloride (0.9 ml) was added. A crimson precipitate formed at once. It was the desired adduct. The mixture was stirred overnight at room temperature to complete the reaction and filtered. The adduct was washed with dilute HCl (20 ml), ethanol (20 ml) and diethyl ether (20 ml) and characterised by analyses and its infra-red spectrum. The yield was 1.6 g, 63% based on the equation:

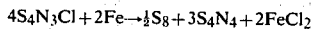

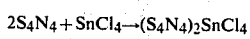

It is also possible to use 'in situ' $S_4N_4$ for other syntheses, such as of $S_4N_4H_4$ or $S_4N_4$/norbornylene adduct, but sulphur contamination can be a problem in these cases. In addition, the adduct $(S_4N_4)_2SnCl_4$ suspended in benzene can be reduced, by $SnCl_2.2H_2O$, to $S_4N_4H_4$.

EXAMPLE 17

In this Example we prepare cyclopentathiapentazenium tetrachloroferrate (III) $S_5N_5{}^+FeCl_4{}^-$.

A mixture of trichlorocyclotrithiatriazene $(NSCl)_3$ (6.0 g, 24.5 mmole) and iron turnings (2.5 g, 44.6 mmole) was stirred for 18 hours in nitromethane (25 ml). Liquid $SO_2$ will also work similarly. Thin layer chromatography of the solution during the early stages of the reaction showed the presence of $S_4N_4$. The nitromethane was evaporated to low bulk, and the yellow product filtered and extracted with 50 ml thionyl chloride (50 ml). Recrystallisation from further thionyl chloride gave $S_5N_5{}^+FeCl_4{}^-$ (2.62 g, 42%). Use of aluminium instead of iron turnings gives $S_5N_5{}^+AlCl_4{}^-$. Attempts to replace $FeCl_4{}^-$ by other anions (e.g. $NCS^-$, $PF_6{}^-$ and $C_6H_5O^-$) by metathesis have been shown, by thin-layer chromatography, to result in decomposition with formation of $S_4N_4$.

EXAMPLE 18

In Example 18, a black conducting iodinated sulphur nitride polymer is produced in the vapour phase from $S_4N_3Cl$ and NaI. A glass pyrolysis tube (60 cm × 3 cm external diameter) was connected via a tap, ball and socket joint and liquid nitrogen trap to a vacuum line fitted with a mercury diffusion pump. Cyclotetrathiatriazenium chloride $S_4N_3Cl$ (1.0 g, 4.8 mmole) was contained in a pre-weighed glass bucket at the bottom of the pyrolysis tube. An oil bath warmed the bottom part of the tube. Sodium iodide supported on glass wool (details below) was packed loosely (to a height of 20 cm) in the tube above the $S_4N_3Cl$. The plug of glass wool/sodium iodide was surrounded by a heating mantle consisting of 117 loops at 2 mm spacing of nichrome wire of resistance 26.25 Ω/m cemented helically inside a glass tube (4.5 cm inside diameter) sliding easily over the pyrolysis tube. This design provides a good heat profile (±1° C. over ±4 cm at the centre of the mantle) and a temperature of 250 (±5)° C. over the whole tube at an applied voltage of about 145 V. The glass wool (6.09 g; fibre diameter 3–5 μm) was vacuum dried (300° C., 12 hours) and shaken with a solution of vacuum dried (300° C., 12 hours) sodium iodide (ca. 2 g) in dry methanol (35 ml). After evaporation of the methanol, the glass wool was vacuum dried (20° C., 4 hours) and weighed (7.35 g).

The top of the pyrolysis tube was surrounded by a glass cooling jacket (14 cm × 6 cm external diameter) with circulating alcohol (10° C.). The system was gradually (over 15 minutes) evacuated to below $5 \times 10^{-3}$ torr using a rotary vacuum pump assisted by the mercury diffusion pump. The mantle was heated to 250° C. and then the oil bath gently heated to a maximum of 130° C. Pumping was continued for 3—4 hours, until the cyclotetrathiatriazenium chloride had mostly vaporised.

During the reaction a compact layer of black, flaky material condensed in the cold zone. This material, in a yield of 0.9—1.04 g, was removed in a dry, inert atmosphere to avoid surface hydrolysis.

A typical analysis gave S, 49.90; N, 15.59; I, 34.51; which corresponds to $S_3N_{2.15}I_{0.53}$. The infra-red spectrum and X-ray data are shown in Tables 1 and 2. The d.c. resistance of a plug (3.1 mm diameter × 3.1 mm) of the material (compressed to 2 gigapascals) at room temperature between Pt electrodes was found to be about 10Ω. The black polymeric product had a compact and brittle constitution and could be scraped off the pyrolysis tube wall as rigid flakes. It had a semi-metallic lustre which tarnished only slightly over several months when kept in a sealed sample bottle. On heating above 40° C. at below $10^{-6}$ mm the product decomposes to $S_4N_4$, sulphur and iodine. The polymer was moisture sensitive and when left exposed to moist air over 3-4 days it hydrolysed fairly rapidly to give a greyish powder with release of iodine. Examination of the product under the microscope ($\times 175$ and $\times 500$) showed that the slightly surface-hydrolyzed material had a dull, pitted surface and was largely non-crystalline. Infra-red absorptions, Table 1, also revealed some hydrolysis (absorptions around 3200 and 1390 cm$^{-1}$ are due to $\nu_{N-H}$) and that some decomposition to tetrasulphur tetranitride had occurred.

Other peaks were within the typical range of S-N absorptions (1500 cm$^{-1}$ to 600 cm$^{-1}$) but differed from those in $S_4N_4$ and $(SN)_x$. The unhydrolysed product under the microscope had a shiny bronze fibrous appearance. The proportion of iodine in the polymer varied with the temperature of condensation, being 1.3 atoms per 3 S atoms at $-77°$ C., and 0.5 atoms per 3 S atoms at $+10°$ C. The higher value is likely to include elemental iodine which would not condense (by contrast) at $+10°$ C.

The mass spectrum is typical of the general breakdown of a sulphur-nitrogen ring or chain and is similar to that for $(SN)_x$ and $S_4N_4$.

Confirmation of the low degree of crystallinity in the polymer is afforded by the X-ray powder diagrams. Diffraction lines were only faintly visible even after 48 hours' exposure to X-rays. The X-ray powder data, Table 2, did not show any crystalline iodine in the polymer. Iodine was probably present in the polymer as anions and/or terminal S-I. Hydrolysis of the S-I bonds would explain the formation of free iodine. Sulphur does not appear to be an impurity in the original polymer but there is evidence for its presence in the residue after heat treatment. The diffraction lines of the polymer were substantially different from $(SN)_x$.

This method is rapid, single-stage and avoids isolation of potentially explosive tetrasulphur tetranitride and disulphur dinitride.

TABLE 1

Infra-red absorption of the compound made according to the foregoing example:

3200-3100 w; 1390 m; 1190 vw, br; 1110 m, br; 1030 vw, br; 923 ms; 850—750 w, br; 705 ms, br; 610 m, br; 563 ms; 460 w, br; 348 ms.

br=broad; m=medium; s=strong; v=very; w=weak

TABLE 2

X-ray diffraction data (d-spacing) of black poly(sulphur nitride) iodide. (Si calibration ASTM No. 5-0565.)

4.782; 4.575; 4,361; 3.921; 3.869; 3.282; 3.237; 3.163; 3.135; 3.063; 3.012, no further lines resolved.

EXAMPLE 19

This Example demonstrates that cyclotetrathiatriazenium chloride $S_4N_3Cl$ vaporised at 130° C. reacts with silver at 300° C. to give AgCl, $Ag_2S$ and $S_2N_2$, the last of which may be isolated to polymerise to a chlorine-doped $(SN)_x$ (poly (sulphur nitride)).

Cyclotetrathiatriazenium chloride ($S_4N_3Cl$) was prepared from $S_3N_2Cl_2$ and recrystallised from thionyl chloride. The thionyl chloride was purified by twofold distillation from triphenylphosphite. The fine yellow crystals were dissolved (about 1 g/10 ml) in refluxing thionyl chloride and cooled slowly to room temperature, under dry nitrogen. Care was taken that the crystallisation temperature did not fall much below 20° C. since, when cooled in a refrigerator (about $-5°$ C.) or evaporated under reduced pressure, the solution usually darkened and the precipitated yellow crystals turned dark green. Such contaminated product contained four extra infra-red absorptions at 965, 945, 710 and 590 cm$^{-1}$.

Silver wool of 99.99% purity, about 50 $\mu$m diameter, was coiled and formed into a plug. The plug was degreased with hexane in a Soxhlet extractor, washed in concentrated ammonia and dried in vacuo.

An all-glass pyrolysis apparatus (FIG. 1) was set up consisting of a train of two U-tubes 6, 7 and a pyrolysis tube 1 within transparent furnaces 4, 5. A jointless system with seal-off sections and seal-off constrictions b, c, d, e and f was chosen since it allowed a large proportion of the apparatus to be flamed out under vacuum, and thus to achieve a thorough outgassing. It also facilitated the transfer, isolation and storage of the volatile, moisture-sensitive products.

A charge 2 of $S_4N_3Cl$ (0.460 g, 2.24 mmole) was placed in the pyrolysis tube 1, which was plugged with 1.373 g (12.73 mmole) of the silver wool 3. The inset diagram shows the temperature distribution along the axis of the pyrolysis tube 1.

The reaction progressed in three distinct stages. (i) For about two hours after the temperature of the $S_4N_3Cl$ had steadied at 130° C. it remained confined to the silver zone (formation of $Ag_2S$ and AgCl). (ii) In the second stage two simultaneous processes were observed; the formation of a blue transparent layer in zone $Z_1$ and the formation of white $S_2N_2$ deposits in zone $Z_2$ and zone $Z_3$. After about three hours, when more than a half of the initial $S_4N_3Cl$ charge was spent, the appearance of a brown substance in zone $Z_3$ heralded the third stage, which was characterized by continuing formation of $S_2N_2$ accompanied by simultaneous production of intensively coloured (orange to brown) by-products which contaminated the disulphur dinitride. Towards the end of the reaction an orange-yellow ring formed at the top of zone $Z_3$ (later identified as $NSCl)_3$). (In a further experiment, already-sulphidised silver wool was used in place of the pure wool. Here, the first stage was absent and an immediate formation of the blue deposit (characteristic of the commencement of stage ii) occurred as soon as the temperature of the $S_4N_3Cl$ charge reached about 100° C. Partly or wholly replacing the silver sulphide, silver selenide and/or silver telluride can be used, thus implanting a certain proportion of selenium/tellurium into the polymer.) The total yield of the $S_2N_2$ (about 55%) along with some other volatile constituents was collected in the U-tube 7 cooled at $-196°$ C. and sealed off. The U-tube 6 was held at 0° C. The $S_2N_2$ crystals grew at room temperature and were left to polymerise over a period of 6 weeks. After that time all the deposits, irrespective of their original colour, turned dark blue. The $(SN)_x$ crystals which grew partly on clean glass surfaces and partly on the dark blue felt-like layers showed brass yellow colour and a high metallic lustre. They range from sub-millimeter to millimeter sizes, and a large proportion had well developed facets and belonged decidedly to the 'less fibrous' class.

A well-developed $(SN)_x$ crystal was examined by electron probe micro-analysis simultaneously with another $(SN)_x$ crystal, prepared by the usual route from $S_4N_4$. The following results were obtained:

| Electron Probe Micro-analysis of $(SN)_x$ Crystals | | | | |
|---|---|---|---|---|
| | From $S_4N_3Cl$ | | From $S_4N_4$ | |
| | Sulphur wt % | Chlorine wt % | Sulphur wt % | Chlorine wt % |
| One spot | 69.65 | 0.03 | 69.36 | 0.03 |
| Another spot | 69.49 | 0.07 | 69.34 | 0.00 |
| Yet another spot | 69.47 | 0.00 | 69.32 | 0.00 |
| | 69.54 | 0.05 | 69.34 | 0.01 |
| Theory | 69.59 | | | |

EXAMPLE 20

In Examples 20 and 21, poly(sulphur nitride), $(SN)_x$, in the form of a thin layer is made from cyclopentathiapentazenium tetrachloroferrate (III).

Silver wool of 99.99% purity, about 50 μm diameter, was coiled and formed into a plug. The plug was degreased with hexane in a Soxhlet extractor, washed in concentrated ammonia and dried in vacuo. Cyclopentathiapentazenium tetrachloroferrate (III) was prepared by the reaction of $(NSCl)_3$ with iron. The apparatus used consisted of an upright sublimation tube fitted with a water-cooled cold finger depending from the top of the tube. The sublimation tube was connected via all-glass joints and a liquid nitrogen trap to a vacuum line fitted with a mercury diffusion pump. A heating mantle, of nickel-chrome wire coiled longitudinally around a split heat-resisting glass tube, was fastened around the sublimation tube. The heating mantle was arranged to produce a temperature of 240° C. around the sublimation tube. An oil bath warmed the bottom part of the tube.

Cyclopentathiapentazenium tetrachloroferrate (III) (0.27 g, 0.63 mmole), prepared as set forth in Example 17, was placed in the bottom of the tube, between which and the cold finger was a plug (0.25 g, 23.2 mmole) of the silver wool. The system was kept evacuated to below $10^{-3}$ torr by the mercury diffusion pump. With the mantle at 240° C. the oil bath was gently heated to a maximum of 130° C. The silver wool rapidly blackened due to the formation of $Ag_2S$ and after 6 hours a blue film of $(SN)_x$ became apparent on the cold finger. After 11 hours, the $(SN)_x$ on the lower part of the cold finger had assumed a bronze sheen. Although after 16 hours the $S_5N_5FeCl_4$ charge had not been completely exhausted, there was a substantial bronze layer of polymer adhering to the lower part of the cold finger, with a blue film of polymer above. In this region there were a few small green patches (identified from their infrared spectra as a $S_4N_4/(SN)_x$ mixture) presumably due to incomplete catalytic conversion by the $Ag_2S$. The residue of unreacted $S_5N_5FeCl_4$ had assumed a khaki colour in the course of the experiment and $S_4N_3FeCl_4$ was also present.

Another experiment using $S_5N_5AlCl_4$ gave no reaction under similar conditions.

EXAMPLE 21

Example 20 was repeated using $S_5N_5FeCl_4$ but omitting the silver wool. The result was a green layer of $S_4N_4$ and $(SN)_x$ on the lower part of the cold finger with a blue film of $(SN)_x$ above this. Thus some $(SN)_x$ can be produced from $S_5N_5FeCl_4$ even when no silver wool as catalyst is employed. This is not the case with $S_4N_4$ and $S_4N_3Cl$.

Thus, Examples 20 and 21 represent a new route to films of $(SN)_x$, avoiding the use of $S_4N_4$ or $S_2N_2$.

We claim:

1. A compound of the formula $(S_3N_bI_c)_x$ where b is from 1.9 to 2.3, and c is from 0.4 to 1.3.

2. The compound according to claim 1, wherein b is from 2.1 to 2.3.

3. The compound according to claim 1 or 2, wherein c is from 0.4 to 0.6.

4. A method of producing a compound according to claim 1, comprising contacting $S_4N_3Cl$ vapour with an iodide and cooling the contacted vapour from above to below room temperature.

5. The method according to claim 4, wherein the iodide is held at at least 150° C.

6. The method according to claim 4, wherein the iodide is held at at least 200° C.

7. The method according to claim 4 wherein the iodide is in the form of a salt.

8. A method of producing poly(sulphur nitride), comprising contacting $S_4N_3Cl$ vapour with silver sulphide and allowing the contacted vapour to condense to give $S_2N_2$, which is then allowed to polymerise at room temperature.

9. The method according to claim 8, wherein the silver sulphide is held at at least 250° C.

10. The method according to claim 8, wherein the silver sulphide is derived from metallic silver which is sulphidised by contact with the $S_4N_3Cl$ vapour.

11. The method according to claim 8, wherein the silver sulphide is at least partly replaced by at least one of silver selenide and silver telluride.

12. A method of producing poly(sulphur nitride), comprising heating $S_5N_5FeCl_4$ in an inert atmosphere to at least 100° C. and condensing the resulting vapour.

13. The method according to claim 11, wherein the resulting vapour is condensed at from 0° C. to 15° C.

14. The method according to claim 11, wherein the vapour is contacted with silver before being condensed.

15. The method according to claim 11, wherein the condensation is performed on a cooled surface, whereby the poly(sulpur nitride) is produced in the form of a layer.

* * * * *

UNITED STATES PATENT AND TRADEMARK OFFICE
CERTIFICATE OF CORRECTION

PATENT NO. : 4,268,491

DATED : May 19, 1981

INVENTOR(S) : ARTHUR J. BANISTER ET AL

It is certified that error appears in the above—identified patent and that said Letters Patent is hereby corrected as shown below:

On the title page, Item [75] should read: --- Inventors:

Arthur J. Banister, Durham; Andrew J. Fielder, High

Shincliffe; Zdenek V. Hauptman, Bishop Auckland;

Richard G. Hey, Halifax; Nigel R. M. Smith, Packington,

Nr. Ashby de la Zouch, all of England---.

Signed and Sealed this

Eleventh Day of August 1981

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : 4,268,491

DATED : May 19, 1981

INVENTOR(S) : ARTHUR J. BANISTER ET AL

It is certified that error appears in the above—identified patent and that said Letters Patent is hereby corrected as shown below:

On the Title page Item [75] should read:

-- Arthur J. Banister, Durham; Andrew J. Fielder, High Shincliffe; Zdenek V. Hauptman, Bishop Auckland; Nigel R. M. Smith, Packington, Nr. Ashby de la Zouch, all of England --.

Signed and Sealed this

Seventeenth Day of November 1981

[SEAL]

Attest:

GERALD J. MOSSINGHOFF

Attesting Officer

Commissioner of Patents and Trademarks